(12) United States Patent
Cados

(10) Patent No.: US 9,138,103 B1
(45) Date of Patent: Sep. 22, 2015

(54) PORTABLE STIRRING DEVICE

(71) Applicant: Dimitri Cados, Orinda, CA (US)

(72) Inventor: Dimitri Cados, Orinda, CA (US)

( * ) Notice: Subject to any disclaimer, the term of this patent is extended or adjusted under 35 U.S.C. 154(b) by 0 days.

(21) Appl. No.: 14/335,102

(22) Filed: Jul. 18, 2014

(51) Int. Cl.
*A47J 43/07* (2006.01)
*B01F 15/00* (2006.01)
*B01F 7/00* (2006.01)
*B01F 7/16* (2006.01)

(52) U.S. Cl.
CPC .............. *A47J 43/0711* (2013.01); *B01F 7/002* (2013.01); *B01F 7/0095* (2013.01); *B01F 7/00716* (2013.01); *B01F 7/00725* (2013.01); *B01F 7/00941* (2013.01); *B01F 7/1655* (2013.01); *B01F 15/00012* (2013.01); *B01F 15/0072* (2013.01); *B01F 15/00487* (2013.01); *B01F 15/00538* (2013.01)

(58) Field of Classification Search
CPC .............. B01F 5/0072; B01F 7/00716; B01F 7/00725; B01F 7/00933; B01F 7/00941; B01F 7/0095; B01F 7/1655; A47J 43/0711
USPC ......... 366/241–251, 281–286, 308, 276–278; 99/348
See application file for complete search history.

(56) References Cited

U.S. PATENT DOCUMENTS

| | | | | |
|---|---|---|---|---|
| 723,977 A * | 3/1903 | Barney | | 366/282 |
| 817,400 A * | 4/1906 | Stanley | | 366/281 |
| 1,255,626 A * | 2/1918 | Moore | | 366/308 |
| 1,447,653 A * | 3/1923 | Fish | | 366/247 |
| 1,983,788 A * | 12/1934 | Joseph | | 68/53 |
| 2,719,703 A * | 10/1955 | Boakes | | 366/244 |
| 2,805,843 A * | 9/1957 | Block | | 366/343 |
| 3,011,768 A * | 12/1961 | Clark | | 366/285 |
| 3,357,685 A * | 12/1967 | Stephens | | 366/282 |
| 3,691,938 A * | 9/1972 | Nichols | | 99/348 |
| 3,697,053 A * | 10/1972 | Will | | 366/343 |
| 3,783,770 A * | 1/1974 | Aries | | 99/348 |
| 3,810,605 A * | 5/1974 | Lambert | | 366/282 |
| 3,905,585 A * | 9/1975 | Wallman | | 366/282 |
| 3,960,369 A * | 6/1976 | Sommer | | 366/282 |
| 4,023,780 A * | 5/1977 | Egid | | 366/206 |
| 4,151,792 A * | 5/1979 | Nearhood | | 99/348 |
| 4,155,656 A * | 5/1979 | Kramer | | 366/98 |
| 4,184,779 A * | 1/1980 | Detmer | | 366/282 |
| 4,339,992 A * | 7/1982 | Kurland | | 99/348 |
| 4,429,624 A * | 2/1984 | Linn | | 99/348 |
| 4,492,713 A * | 1/1985 | Chauvin | | 426/231 |
| 4,576,089 A * | 3/1986 | Chauvin | | 99/332 |
| 4,773,317 A * | 9/1988 | Wickboldt, Jr. | | 99/348 |
| 4,820,054 A * | 4/1989 | Wong | | 366/287 |
| 4,832,501 A * | 5/1989 | McCauley | | 366/279 |
| 4,856,910 A * | 8/1989 | Cuschera | | 366/282 |
| 4,921,356 A * | 5/1990 | Bordenga | | 366/343 |
| 4,959,517 A * | 9/1990 | Jump et al. | | 219/726 |
| 5,013,158 A * | 5/1991 | Tarlow | | 366/251 |

(Continued)

FOREIGN PATENT DOCUMENTS

| | | | | |
|---|---|---|---|---|
| EP | 1160003 A1 * | 12/2001 | | B01F 7/16 |
| GB | 2129322 A * | 5/1984 | | B01F 7/00 |

(Continued)

*Primary Examiner* — Charles Cooley
(74) *Attorney, Agent, or Firm* — Theodore J. Bielen, Jr.

(57) ABSTRACT

A stirring apparatus for agitating fluids in a container utilizing a powered rotor held in a housing. The rotor includes an elongated aperture that loosely engages a stirring elements that is permitted to swing outwardly upon rotation and to drop downwardly to the base of the container.

17 Claims, 11 Drawing Sheets

(56) References Cited

U.S. PATENT DOCUMENTS

| | | | |
|---|---|---|---|
| 5,193,441 A * | 3/1993 | Hayashi | 99/348 |
| 5,201,263 A * | 4/1993 | Teng | 99/335 |
| D341,291 S * | 11/1993 | Dow, III | D7/376 |
| 5,271,673 A * | 12/1993 | Bohnet et al. | 366/245 |
| 5,332,310 A * | 7/1994 | Wells | 366/129 |
| 5,372,422 A * | 12/1994 | Dubroy | 366/143 |
| 5,476,321 A * | 12/1995 | McNaughton | 366/261 |
| 5,516,208 A * | 5/1996 | Givant | 366/251 |
| 5,533,805 A * | 7/1996 | Mandel | 366/285 |
| 5,535,665 A * | 7/1996 | Wong | 99/348 |
| 5,613,425 A * | 3/1997 | Krznaric | 99/348 |
| 5,617,774 A * | 4/1997 | LaVelle et al. | 99/348 |
| 5,653,536 A * | 8/1997 | Mandel | 366/285 |
| 5,676,464 A * | 10/1997 | Mattar | 366/282 |
| 5,711,602 A * | 1/1998 | Rohring et al. | 366/251 |
| 5,765,947 A * | 6/1998 | Dubroy | 366/249 |
| 5,816,136 A * | 10/1998 | Stallings | 99/335 |
| 5,829,344 A * | 11/1998 | Lande | 99/453 |
| 5,836,687 A * | 11/1998 | Khalid | 366/207 |
| 5,863,121 A * | 1/1999 | Dunk | 366/285 |
| 5,890,804 A * | 4/1999 | Edwards et al. | 366/249 |
| 6,035,771 A * | 3/2000 | Conran et al. | 99/510 |
| 6,089,143 A * | 7/2000 | Figueroa | 99/327 |
| 6,113,258 A * | 9/2000 | Ardent | 366/282 |
| 6,286,990 B1 * | 9/2001 | De Zuazo Torres | 366/282 |
| 6,439,760 B1 * | 8/2002 | Langeloh et al. | 366/206 |
| 7,011,013 B2 * | 3/2006 | Leason | 99/339 |
| 7,422,023 B1 * | 9/2008 | Waters | 134/140 |
| 7,950,844 B2 * | 5/2011 | Murray | 366/251 |
| 8,398,298 B2 * | 3/2013 | Swader | 366/282 |
| 8,616,762 B2 * | 12/2013 | Swader | 366/282 |
| 2003/0193835 A1 * | 10/2003 | Richardson | 366/282 |
| 2007/0006738 A1 * | 1/2007 | Beesley | 99/348 |
| 2011/0011275 A1 * | 1/2011 | Murray | 99/348 |
| 2012/0063258 A1 * | 3/2012 | Iverson et al. | 366/63 |
| 2012/0147696 A1 * | 6/2012 | Swader | 366/249 |
| 2015/0071027 A1 * | 3/2015 | Cados | 366/331 |

FOREIGN PATENT DOCUMENTS

| | | | |
|---|---|---|---|
| GB | 2471503 A | * | 1/2011 |
| WO | 82/04385 | * | 12/1982 |

* cited by examiner

PORTABLE STIRRING DEVICE

CROSS-REFERENCES TO RELATED APPLICATIONS

The present application is a continuation of U.S. patent application Ser. No. 14/290,727 filed 29 May 2014 which is a continuation-in-part of U.S. patent application Ser. No. 14/255,245, which is a continuation-in-part of U.S. patent application Ser. No. 14/020,648, filed 6 Sep. 2013, which claims the benefit of U.S. Provisional Patent Application Ser. No. 61/832,638, filed 7 Jun. 2013.

BACKGROUND OF THE INVENTION

The present invention relates to a novel and useful stirring apparatus for mixing or agitating fluids in a container.

Fluids and mixtures, such as foodstuffs, are often placed in a container and need to be mixed or stirred in order to complete a particular preparation processes. Due to variations in viscosity of a particular fluid mixture, it is important that all levels of the mixture within a container be stirred or agitated.

In the case of a foodstuff, a failure to stir the ingredients in a container while cooking may result in an unevenly cooked product or scorching of the contents at the bottom of the container.

Currently there are certain commercial stirring devices that are used to stir the contents of the container. For example the Robo Stir stirring device is placed on the bottom of the container and contains three plastic rotating legs to stir the contents. However, the Robo Stir stirring device has limited use due to low power capacity and fragile construction. Another commercial stirring device, known as the Ardente Stirrer attaches to the top of a pot or container that includes paddles that extend downwardly into the container for rotation. However, the Ardente Stirrer stirring device is limited to particular containers having handles.

In addition, many other stirring and agitating devices have been proposed in the past. For example, U.S. Design Pat. Des 421,616 shows a mixing device that clamps to the top of the container and includes a shaft chuck which allows a mixing terminus to extend into the container.

U.S. Pat. No. 3,960,369 describes a stirring mechanism in which a battery operated roller is mounted to move about the top rim of a container to allow a motor and mixing arms to extend into the container to sweep the contents of the container.

U.S. Pat. No. 5,476,321 shows a container stirring device that sits on a surface adjacent the container and includes a stirring implement in the form of a perforated paddle to move within the container.

U.S. Pat. Nos. 4,832,501, 5,613,425, and 6,113,258 describe container fluid mixers that straddle the top portion of the container and permit the extension of stirrers downwardly therefrom.

U.S. Pat. Nos. 2,578,901 and 2,707,622 illustrate stirring mixer that affix to the side of a container and permit the use of beaters to be immersed within the contents of the container.

U.S. Pat. Nos. 2,140,315, 2,209,287, 2,805,843, 2,828,114, 3,068,186, 3,905,585, 5,332,310, and 6,749,331 teach mixing devices that clip on or clamp on to the side of a container and allow the extension of mixing arms into the contents of the container.

U.S. Pat. Nos. 1,167,536, and 6,286,990, show agitating and mixing devices that include stirring ends that pivot relative to a central shaft and include flanges that extend upwardly along the side of the container.

U.S. Pat. Nos. 4,576,089, 5,617,774, describes stirring apparatuses that include arms extending from a central shaft that pivot and may be moved upwardly towards the central shaft when not in use.

U.S. Pat. Nos. 5,533,805 and 5,653,536 utilize stirrers that are free-standing or wall mounted and includes adjustable arms and terminal stirring mechanisms.

A mixing apparatus that is capable of self-adjusting its position to mix the contents of different sized containers, and includes stirring portions that automatically position according to the level of the liquid within the container would be a notable advance in the field of food and chemical preparations.

SUMMARY OF THE INVENTION

In accordance with the present invention a novel and useful stirring apparatus for agitating fluids in a container is herein provided.

The stirring apparatus of the present invention utilizes a motor including a rotating output shaft. Motor is operated by a source of power, preferably in the form of battery pack that removably connects to the motor to activate the same. The motor may be mounted on a housing that supports the motor and source of power. In addition, a clamp may be slidably supported on the housing for adjusting the distance between the clamp and motor. The clamp would be employed to hold the apparatus of the present invention to the container holding the fluid being agitated.

A bar is also employed in the present invention and is removably connected to the rotating output shaft of the motor. A first arm is linked to the bar for rotation. First arm includes a first section and a second section. The first and second sections of the first arm are moveable relative to one another to allow extension and retraction of the first arm relative to the bar. In certain embodiments, the first and second sections may be slidable relative to one another, such that the second section of the first arm is supported in such slidable relationship by the first section of the first arm. The first arm may also include a flange, vane, or fin that extends outwardly from the second section of the first arm.

A second arm is also provided in the apparatus of the present invention and is linked to the first bar for rotation in the same manner as the first arm. The second arm also includes first and second sections that may be slidably connected to one another such that the first section of the second arm supports the second section of the second arm. The second arm may also be provided with a flange that extends outwardly from the second arm.

A stop is also provided in conjunction with the second arm to prevent the second arm from rotating downwardly relative to the bar to form an orthogonal angle with the bar. In other words, the axes of the bar and the second arm would form an acute angle relative to one another. The stop may be provided by the formation of a plate fixed to the bar that engages a notch in the first section of the second arm.

In addition, the apparatus may include a housing which is connected to the motor and a clamp that is moveably supported by the housing. In this manner, the apparatus would be supported by a container for the fluid being stirred and allow for the bar associated with the motor to be positioned as desired relative to the open mouth of the container. The clamp may take the form of a pair of jaws, one of which is spring loaded, that are manually operable through a lever.

The device of the present invention may take another form in which a motor, activated by a source of power, turns a shaft linked to rotor. A motor is supported in a housing. The rotor is rotationally mounted in said housing and is provided with an aperture therethrough. The aperture has a dimension of elongated and loosely encompasses a stirring element to allow movement of the stirring element along the dimension of elongation of the aperture and under the influence gravity. In certain instances the aperture through the rotor is generally oval-shaped.

Another form of the device of the present application also, includes a rotational linkage having a first gear connected to said rotor and a second gear connected to the rotating shaft of the motor. The first and second gears meshingly engage one another. In one instance the first gear may comprise a ring gear connected to the rotor while the second gear may comprise a pinion gear having a boss supported by a bearing found in the housing.

Yet another embodiment of the present invention takes the form of a connection between the rotor and stirrer elements in which the rotor not only includes any elongated opening through the rotor, but also includes a pair of cavities adjacent the elongated opening that pass only partially through the rotor. The motor and gearing arrangement for moving the motor would be the same as prior described. In addition, the stirring device is used with such embodiment includes a telescoping shaft that terminates in a pair of ears that extend outwardly from the shaft. The pair of ears frictionally engage the rotor cavities lying adjacent the elongated aperture through the rotor. In this embodiment, the stirring elements used with the rotor are still allowed to tilt and, where a blade is attached to the shaft of the rotor, follow the perimeter of a vessel such a pot in which food is being stirred. In addition, axillary arms may be attached to the shaft of the stirring elements to create a stirring agitation above the bottom of the pot where the main rotor blade is positioned. Again, the elongated opening through the rotor allows the shaft of the stirring element to tilt or lean according to the size of the pot in which the stirring element is located. Moreover, axillary arm used in combination with the blade may be pivotally attached along the same axis which pivotally attaches the blade. Axillary arm may also be fixed in a certain position by tightening a tightened nut threadingly engages a screw which lies along the pivoting axis for the axillary arm and the blade. Moreover, a weight may be attached to the top of the shaft of the stirring element to force a stirring element to the base of the pot or cooking vessel where relatively thick or viscous liquids are being stirred by the device of the present invention.

The device may also be employed as a cooking implement by supporting a skewer holding food stuff over a heat source.

It may be apparent that a novel and useful stirring apparatus for agitating a fluid in a container has been hereinabove described.

It is therefore an object of the present invention to provide a stirring apparatus for agitating a fluid in a container that mounts to the container and is adjustable to provide even thorough stirring of the contents of the container.

Another object of the present invention is to provide a stirring apparatus for agitating a fluid in a container utilizing first and second arms that are connected to a bar and a stop mechanism that permits the separation of the first and second arms from one another into zones vertically separated in the fluid found in the container.

Another object of the present invention is to provide a stirring apparatus for agitating a fluid in a container that prevents uneven mixing of the fluid in the container and scorching of the fluid contents of the container where the application of heat to the container is involved.

Another object of the present invention is to provide a stirring apparatus for agitating a fluid in a container that is relatively simple to use and very efficient in mixing the contents of the container, where the mixing arms within the container lie at various depths within the container.

Another object of the present invention is to provide a stirring apparatus for agitating a fluid in a container that is adaptable to containers having various widths and depths.

Yet another object of the present invention is to provide a stirring apparatus for agitating a fluid in a container that includes an adjustment mechanism that operates horizontally and vertically relative to the orientation of the container.

A further object of the present application is to provide a stirring device that includes a motor driven rotors having an aperture therethrough to loosely confine a stirring element.

Another object of the present application is to provide a stirring device that utilizes a stirring element that is capable of adjusting to containers of varying diameters and depths.

Yet another object of the present application is to provide a stirring device that is readily adaptable to agitating foods of different consistencies and viscosities.

Yet another object of the present invention is to provide a stirring mechanism in which a stirring element may be fixed to rotor by a snap in feature.

A further object of the present invention is to provide a stirring mechanism that allows a stirring element to include multiple blades or arms in various orientations to agitate fluids in a cooking vessel at various depths.

The invention possesses other objects and advantages especially as concerns particular characteristics and features thereof which will become apparent as the specification continues.

Figure 1:
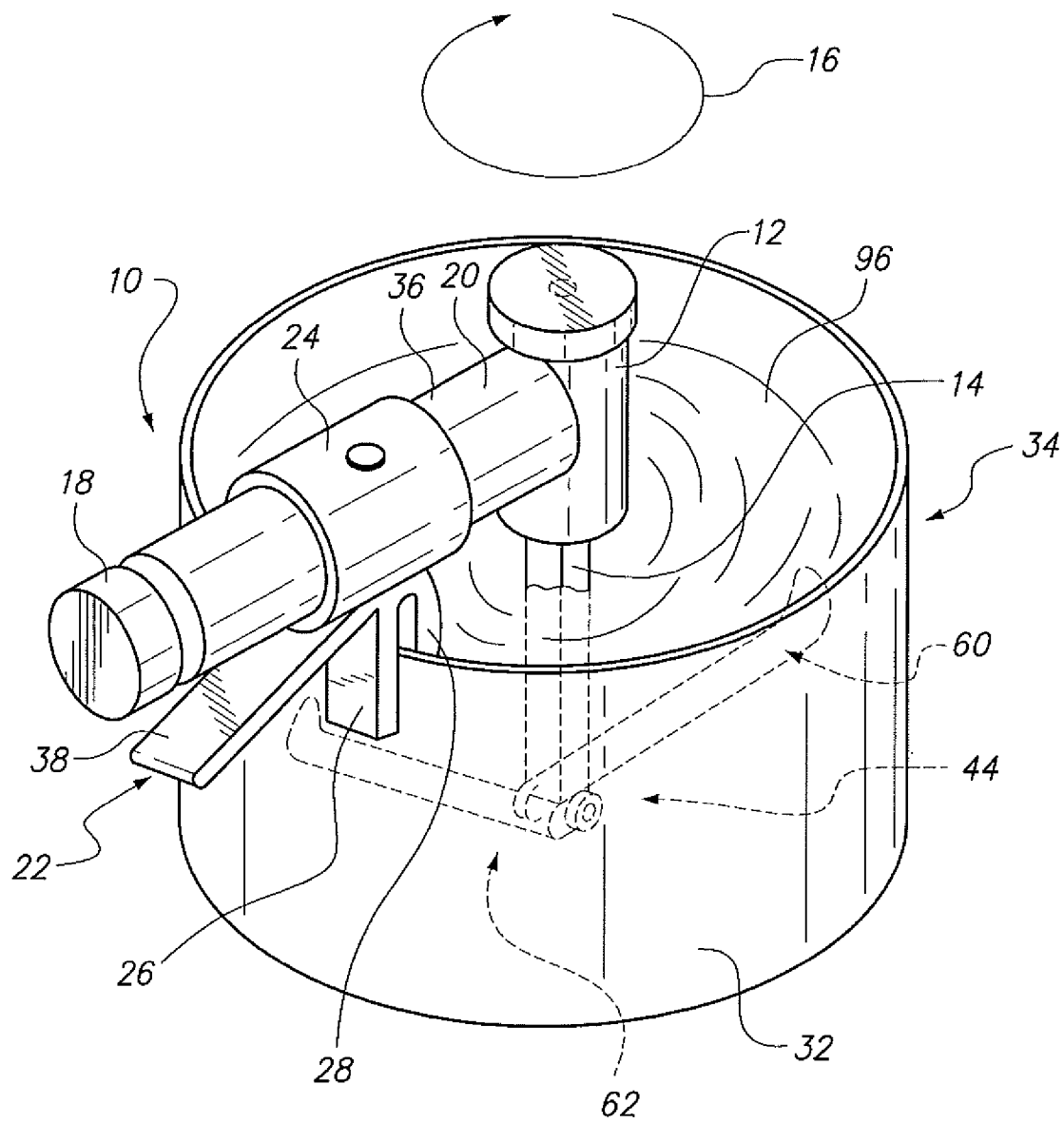
FIG. 1 is a top right perspective view of the apparatus of the present invention in place within a container.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

An embodiment of the stirring apparatus as a whole is depicted in the drawing by reference character 10. The stirring apparatus 10 includes, as one of its elements, a motor 12 which may be a DC Motor of conventional configuration. Motor 12 may take the form of a 12-volt DC Motor having a torque of 2 Kg-cm and a rotational capacity of approximately fifty revolutions per minute. Motor 12 rotates an output shaft 14 according to directional arrow 16, FIGS. 1 and 5-7. Motor 12 is electrically connected to a source of power 18 which may take the form of a battery such as a rechargeable 8.4 volt NiMh unit. Battery 18 may be removable from a housing 20 which connects to motor 12.

A clamp 22 is formed by a hollow cylindrical base 24 that forms a jaw 26 which interacts with a jaw 28, the latter pivoting about a spring loaded pin 30. Spring loaded pin 30 biases jaw 28 to the side portion 32 of a container 34, best shown in FIGS. 6 and 7. Cylindrical base portion 24 of clamp 22 is capable of sliding along the exterior surface 36 of housing 20, thus, being able to position the rotating shaft 14 within container 34 as desired. Grip or lever 38 permits the user to remove stirring apparatus 10 from container 34 and to reposition the same on container 34 as desired. Set screw 40 holds clamp 22 and, thus, motor 12 in position along outer surface 36 of housing 20. Directional arrow 42 depicts the movement of clamp 22 relative to housing 20, FIGS. 6 and 7.

Figure 2:
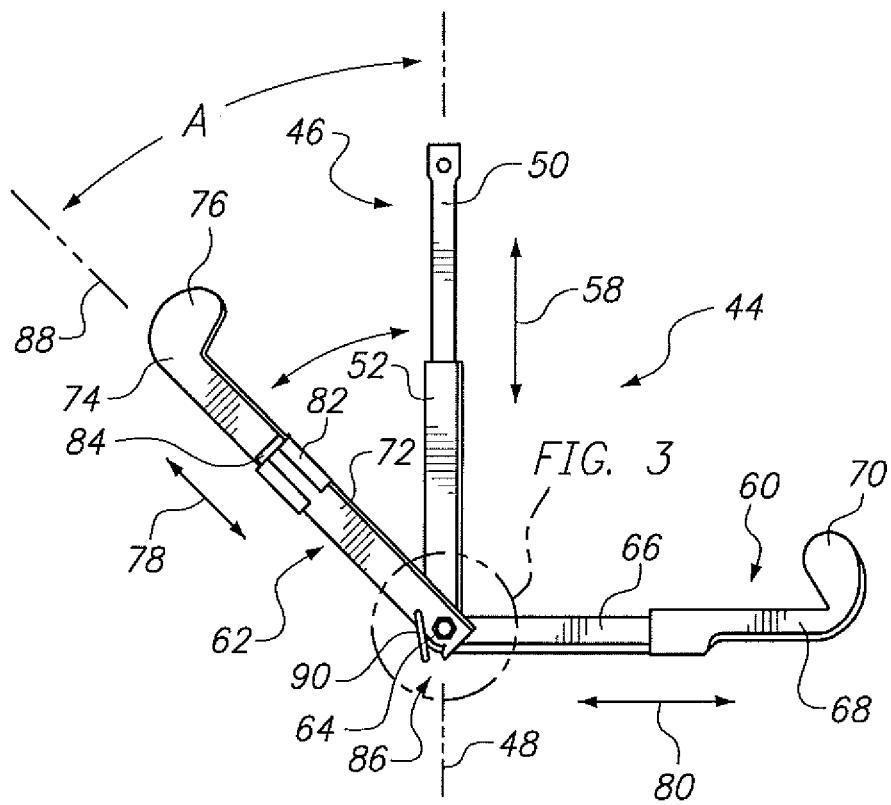
FIG. 2 is a front elevational view of the stirring terminus associated with the apparatus of the present invention.
Figure 3:
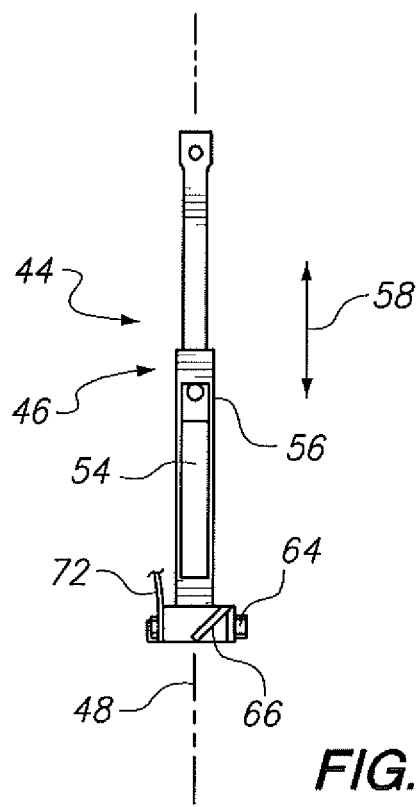
FIG. 3 is a side elevational view of the stirring terminus associated with the apparatus of the present invention.

Turning now to FIGS. 2 and 3, it may be observed that a stirring terminus 44 is shown. Stirring terminus 44 includes a bar 46 which generally lies along axis 48, FIGS. 2 and 3. Bar 46 is formed with a first portion 50 and a second portion 52. First portion 50 and second portion 52 of bar 46 positioned in a telescopic relationship. That is to say, first portion 50 of bar 46 is moveable within a cavity 54 of second portion 52 and a protuberance 56 holds first portion 50 of bar 46 within cavity 54. Directional arrow 58 indicates the relative movement between first portion 50 and second portion 52 of bar 46.

Referring again, to FIGS. 2 and 3, it may be apparent that stirring terminus 44 includes a first arm 60 and a second arm 62. First and second arms 60 and 62 are rotatably linked to second portion 52 of bar 46 via pivot pin 64. That is to say, arms 60 and 62 may rotate towards or away from bar 46, the importance of which will be discussed as the specification continues.

First arm 60 is provided with a first section 66 and a second section 68. First and second sections 66 and 68 are moveable relative to one another, specifically in a slidable relationship. A flange or fin 70 is located a tip of second section 68 of first arm 60 and hydrodynamically serves to propel second section 68 outwards from first section as when shaft 14 rotates.

Second arm 62 also includes a first section 72 that is slidably connected to second section 74. Fin 76 lies at the end or tip of second section 74 of second arm 62. As may be seen on FIG. 2, a channel 82 of second section 74 of second arm 62 slidably engages tongue 84 of first section 72 of second arm 62. A similar mechanism allows the hydrodynamic sliding relationship between first sections 66 and second section 68 of first arm 60, depicted by directional arrow 80. In this manner, first and second arms 60 and 62 conform to containers of varying widths or diameters. It should be realized at first portion 50 of bar 46 include the necessary fitting to be held outwardly from shaft 14 of motor 12, and may be of a conventional configuration, in this regard.

Figure 4:
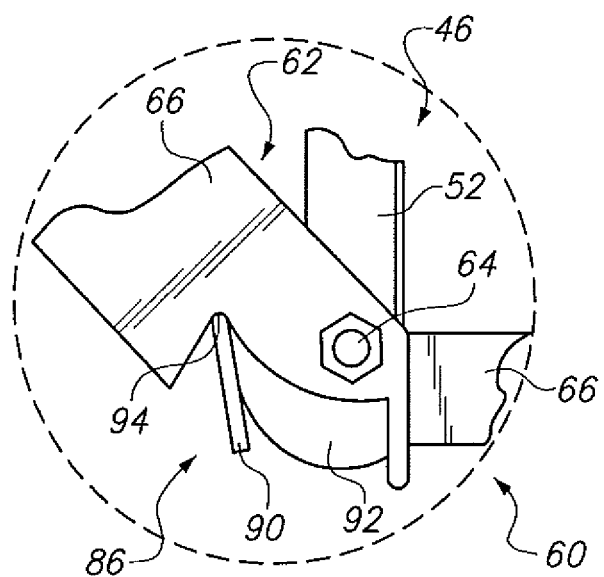
FIG. 4 is an enlarged front elevational view of the stop mechanism for the second arm of the stirring terminus associated with the apparatus of the present invention.

With reference to FIG. 4, a stop 86 is shown to limit the rotational travel of second arm 62 relative to bar 46. Again, referring to FIG. 2, it may be seen that an angle A is formed by stop 86. That is to say, arm 62 may extend outwardly from bar 46 at angle A or at any lesser angle, relative to axes 48 and 88 of bar 46 and second arm 62, respectively. Bar 86 may take the form of a plate fixed to the end 92 of second portion 52 of bar 46. A notch 94 in first section of first arm 62 engages plate 90 to hold second arm 60 in the position depicted in FIGS. 2 and 5.

Figure 8:
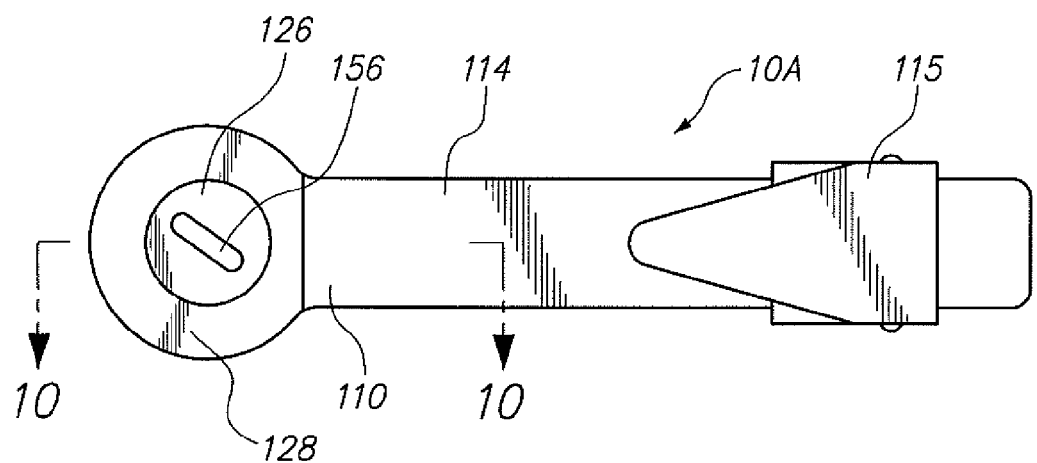
FIG. 8 is a top plan view of another embodiment of a device of the present invention.
Figure 9:
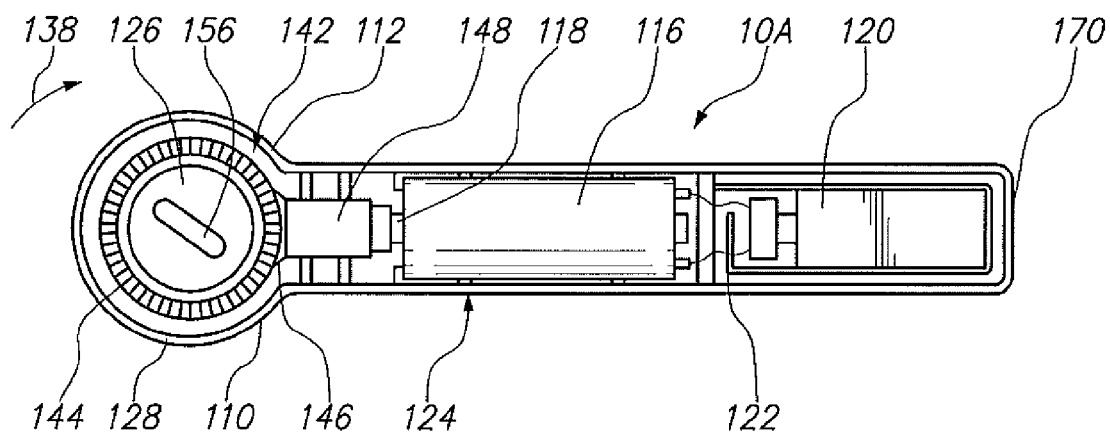
FIG. 9 is a bottom plan view of the embodiment of the interior of the device of FIG. 8, having the bottom cover removed.

Referring now to FIGS. 8 and 9, another embodiment 10A of the stirring device in the present application is depicted. Device 10A is shown with a housing 110 and includes a first portion 112, FIG. 9, and a second portion 114, FIG. 8. A spring loaded clip 115, FIG. 8 is intended to hold device 10A to a food container, such as a pot and the like. Again, with reference to FIGS. 8 and 9, it may be observed that stirring device 10A includes an electrical motor 116 that rotates an output shaft 118. Electrical motor 116 is powered by a battery 120, linked to motor 116 via switch 170 by electrical conductors 122, in a conventional manner. Housing 110 supports motor 116 by a plurality of tabs 124.

A rotor 126 is rotationally mounted within end portion 128. As may be seen on FIG. 10, rotor 126 includes shoulders 130 and 132 that rest on wall 134 of housing first portion 12 and wall 136 of housing second portion 114. Rotor 126 turns or rotates according to directional arrows 138 and 140, FIGS. 9 and 10, respectively.

Again referring to FIGS. 9 and 10, it may be observed that a rotational linkage 142 transfers the movement of the rotating output shaft 118 to rotor 126. Such transfer of motion is achieved by the use of first gear 144 in the form of a ring gear surrounding and connected to rotor 126. Ring gear 144 meshingly engages a second gear 146 in the form of a pinion gear connected to a boss 148. Boss 148 is fastened to rotating shaft 118 of motor 116 by a set screw 150. Boss 148 is supported by bearings 152 and 154 formed as part of housing 110.

Figure 10:
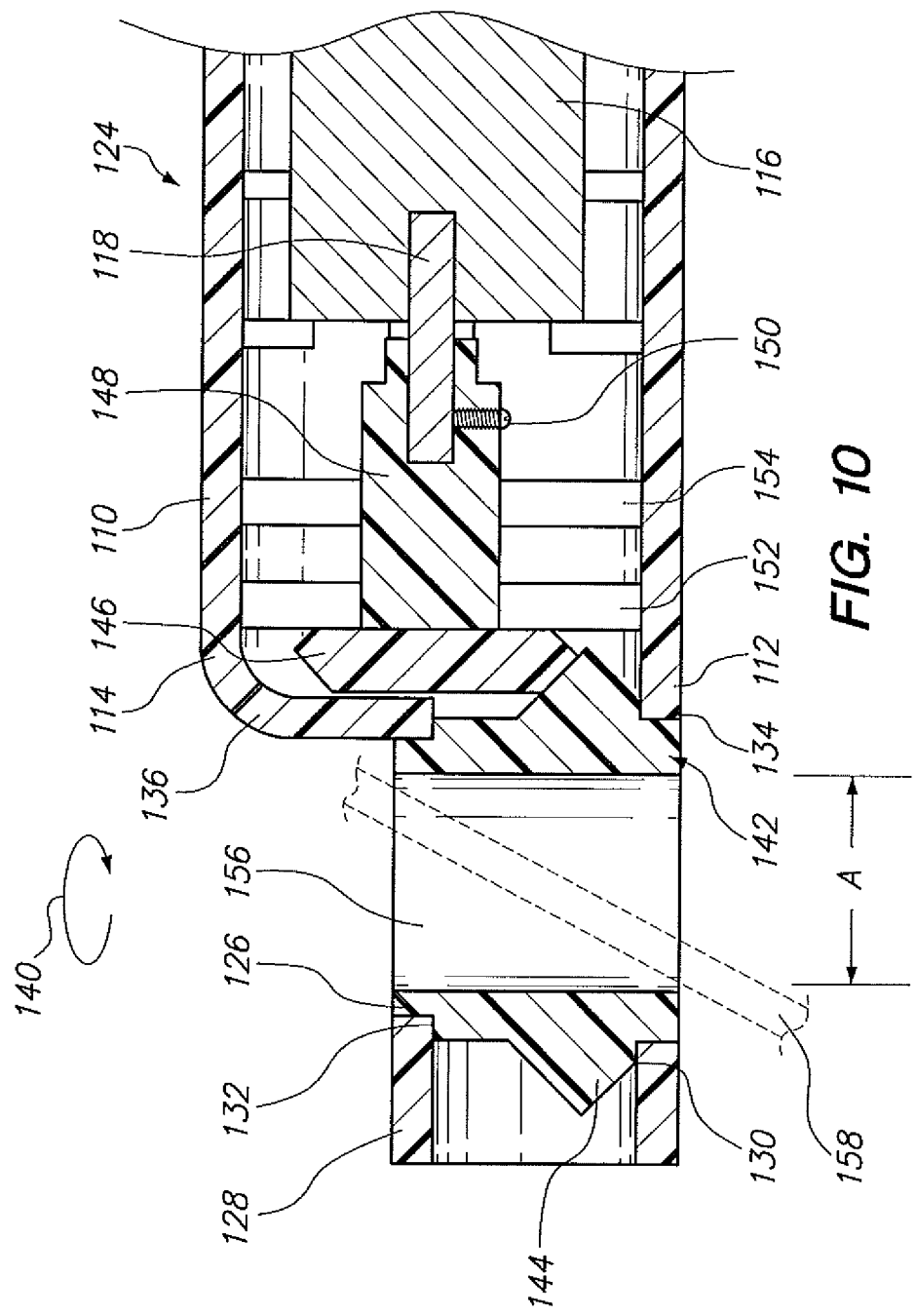
FIG. 10 is a partial sectional view of the device of FIGS. 8 and 9 taken along line 10-10 of FIG. 8.
Figure 11:
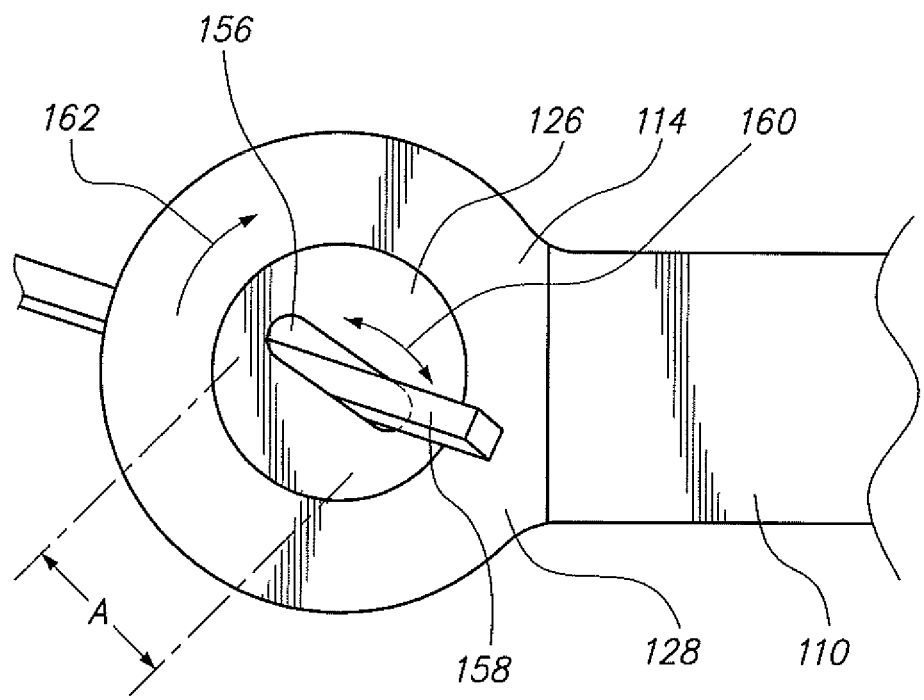
FIG. 11 is a top plan view of the head portion of the housing of the present invention, with a stirring element depicted in the elongated aperture of the rotor.

Most importantly, it should be noted that rotor 126 is fashioned with an aperture 156 therethrough having a dimension of elongation "A", best shown in FIGS. 10 and 11. Dimension of elongated "A" of aperture 156 is oriented within a plane defined by housing 110 and arm or end portion 128. Thus, elongated aperture 156 is sized to allow movement of a stirring element 158 along dimension of elongation "A". Also, elongated aperture 156 is further sized to allow stirring element 158, that may take a variety of forms, to pass through and travel downwardly under the influence of gravity. Thus, aperture 156 loosely confines stirring element 158 to rotor 126. As such, stirring element 158 tends to skew or tilt, directional arrow 160, when rotor 126 turns, directional arrow 162, by motor 116, FIG. 11.

Figure 16:
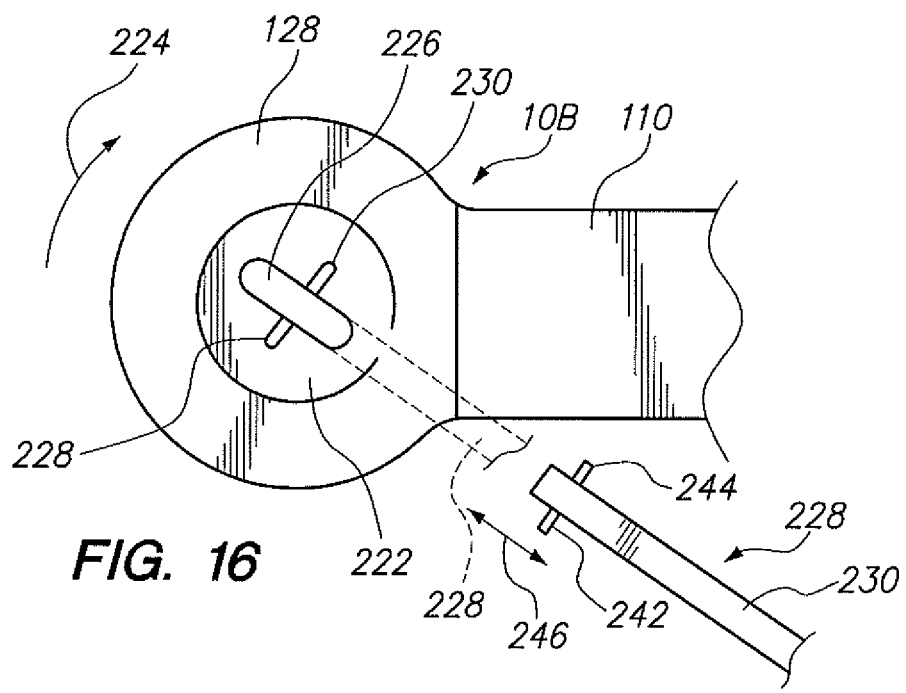
FIG. 16 is a partial plan view of a rotor embodiment which may be employed in a lieu of the rotor shown in FIG. 11.
Figures 17, 18:
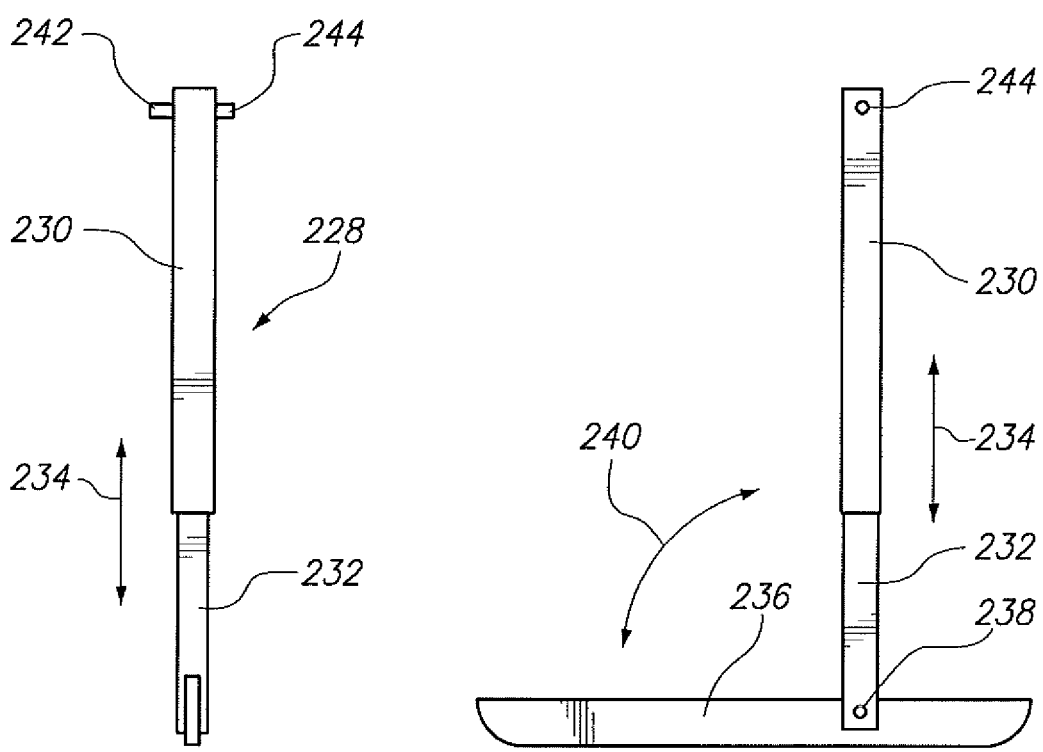
FIG. 17 is a front elevational view of a stirring element useable with rotor of FIG. 16.
FIG. 18 is a side elevational view of the stirring element of FIG. 17.

Looking at FIGS. 16-18, an embodiment 10B of the device of the present application is depicted. It should be understood that alternate rotor 222, FIG. 16, may be employed at the end portion 128 of device 10A. It should be also understood that the motor mechanism and gearing depicted in FIG. 9, may also be employed to turn rotor 222 according to directional 224. Rotor 222 is provided with an elongated aperture 226 that extends completely through rotor 222. Aperture 226 is very similar to elongated aperture 156 of FIG. 9. However, a pair of cavities 228 and 230 extend laterally from aperture 226 and only a partially partial depth through rotor 222.

A stirring element 228, FIG. 17, is employed with rotor 222 and includes a shaft 230 that telescopes relative to shaft 232. Thus, stirring element 228 adjust its length by moving according to directional arrow 234. A blade 236 connects to shaft 232 via a pivot pin 238. Consequently, blade 236 may rotate according to directional arrow 240, FIG. 18. Most importantly, stirring element 228 includes a pair of ears 242 and 244 that extend from shaft 230. Ears 242 and 244 are sized to frictionally engage cavities 228 and 230 of rotor 222, a "snap-in" feature. However, shaft 230 free to rotate relative to rotor 222 in that ears 242 and 244 are capable of rotating within cavities 238 and 230, FIG. 16. Directional 246 of FIG. 16 indicates the direction of movement of stirring element 228 to effect engagement of rotor 222, prior described.

Figure 5:
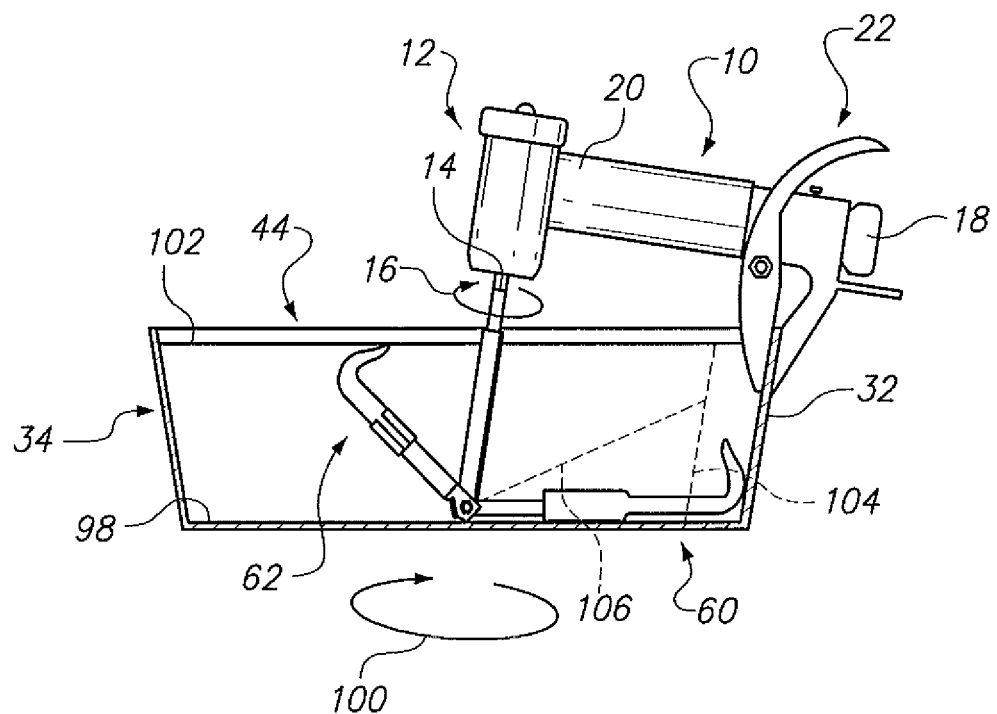
FIG. 5 is a side elevational view of the apparatus of the present invention mounted to a container where a container is shown in section.
Figure 6:
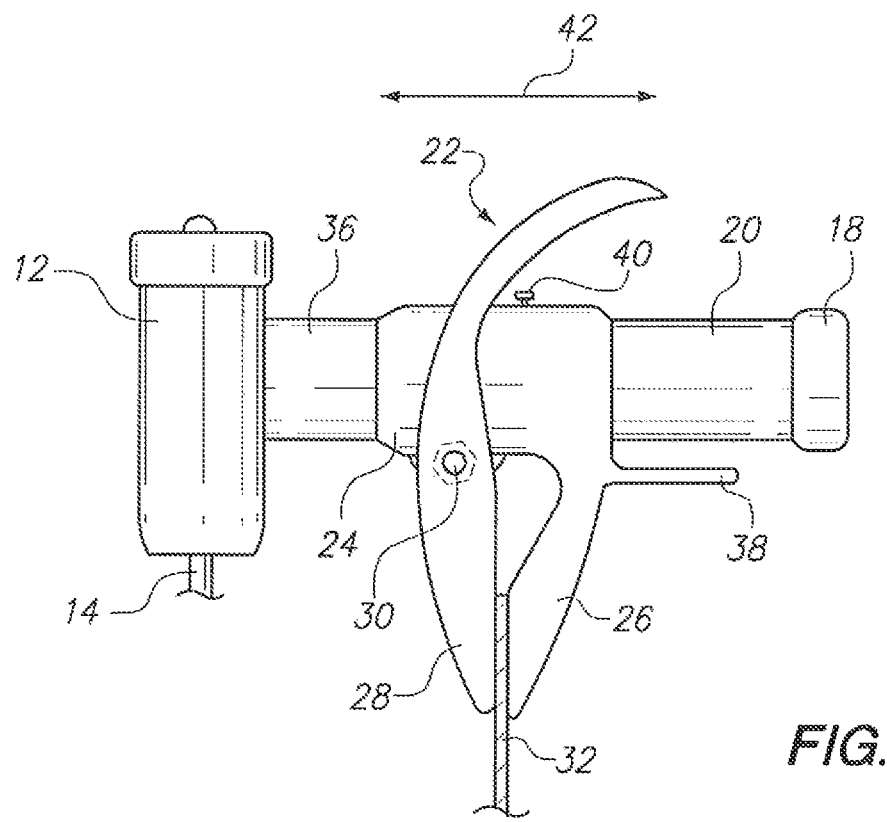
FIG. 6 is a side elevational view of a portion of the apparatus of the present invention during the adjustable position of the clamp.
Figure 7:
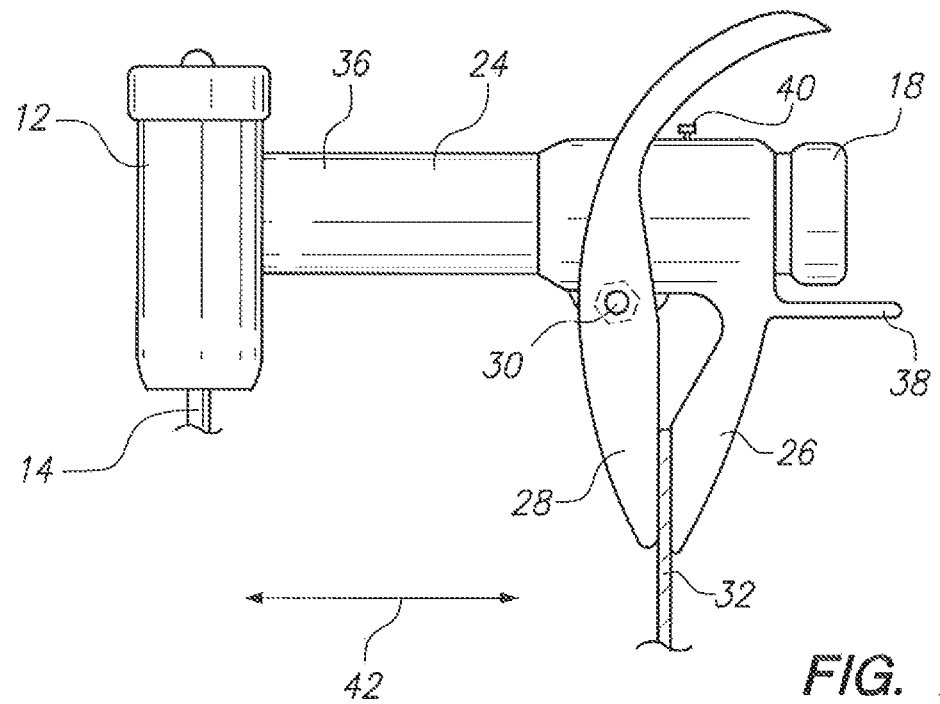
FIG. 7 is yet another side elevational view of the apparatus of the present invention showing the adjustable clamp in another position from that shown in FIG. 6.

In operation, the user places stirring apparatus 10, FIGS. 1-7, on side 32 of container 34 shown in FIG. 5. Clamp 22 clips to side 32 of container 34, best to allow motor 12 to be positioned above container 34 relative to fluid contents 96 found within container, as shown in FIG. 5. At this point, arm 60 lies against the bottom and the side 32 of container 34 while second arm 62 extends outwardly from bar 36 at angle A shown in FIG. 2. Motor 12 turns according to directional arrow 16 while stirring terminus 44 moves in the same manner, according to directional arrow 100. It should be noted that second arm 62 of stirring terminus 44 moves upwardly or downwardly to the surface 102 of fluid contents 96, and no further. It is believed this action is due to the lifting action of flange or fin 76 passing through fluid contents 96. First arm 60 will remain at the bottom of 98 of container 34 due to the weight of first arm 60 and the pitch of first and second sections 66 and 68, FIG. 3. It should be noted that first arm 60 will form an obtuse angle width axis 48 of stirring terminus 44, when axis 48 is not normal to bottom 98 of container 34, FIG. 5. Thus, the fluid contents 96 are agitated throughout its depth between surface 102 and bottom 98 of container 34 during the stirring motion effected by stirring apparatus 10. Should surface 102 of fluid contents 96 move toward bottom 98 of container 34 through attrition or otherwise, second arm 62 will move downwardly relative to side 32 of container 34, through the slidable interaction between first section 72 and second section of second arm 62. Also, should container 32 include a theoretical side portion 104, FIG. 5, first arm 60 will tend to slide up the side of 104 according to dashed line 106. In this manner, stirring apparatus 10 adjusts to particular depths and widths of containers and to the levels of the fluid contents 96 within such containers. The biasing of arms 60 and 62 through the mechanism hereinabove described will ensure a proper stirring of the fluid contents 96 during the stirring processes, the movement of which is indicated by directional arrow 100.

Figure 12:
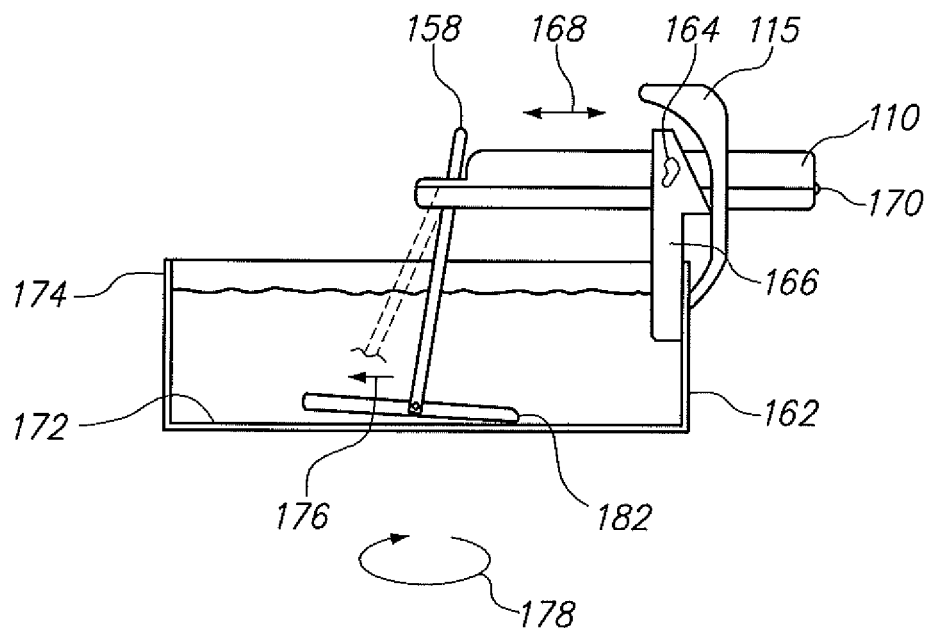
FIG. 12 is a side elevation view of the second embodiment position on a container, shown in section.
Figure 13:
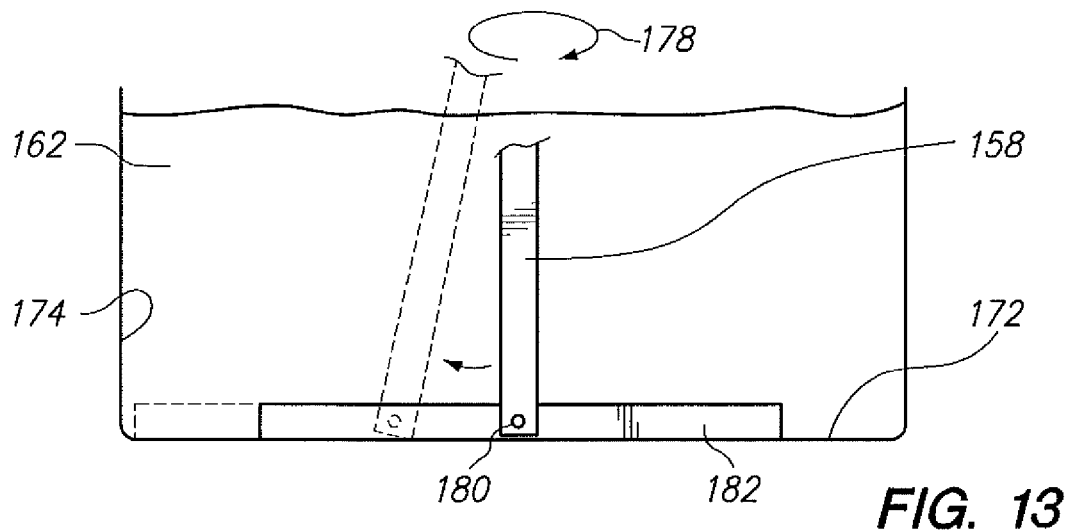
FIG. 13 is a schematic view depicting the turning of a first stirring element in a pot.
Figure 14:
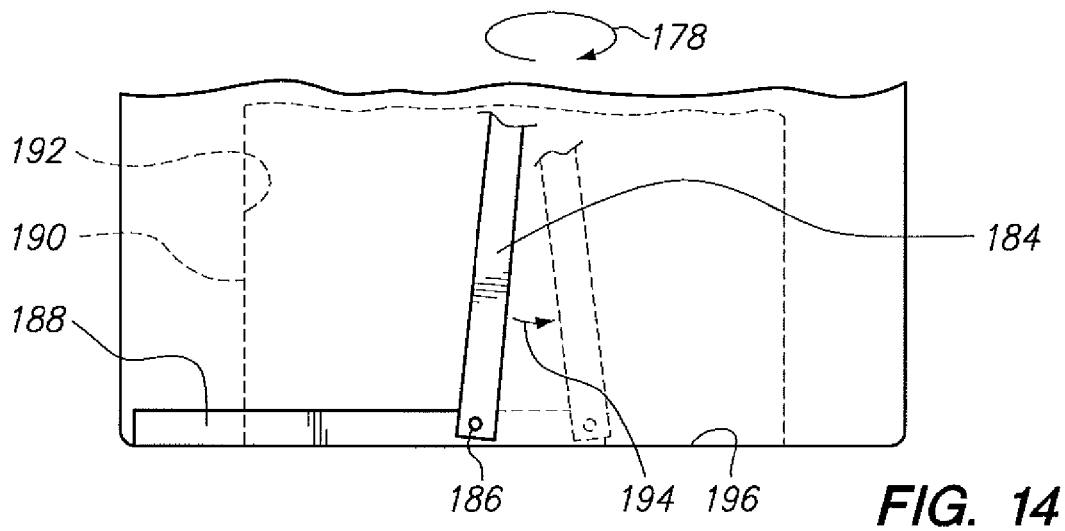
FIG. 14 is a schematic view depicting the turning of a second stirring element in a pot.

In operation, FIGS. 11-15, in particular, stirring device 10A is mounted for use to a container 162 by the use of spring loaded clip 115. It should be realized that spring loaded clip 115 allows the movement of device 10A through an aperture 164 on clip body portion 166, according to directional arrow 168. Once device 10A is in place, (the overall depiction of FIG. 12.) electric motor 116 within the housing 110 is activated by a switch 170 electrically connected to conductors 122 and battery 120, in a conventional manner. Rotor 126 will begin to turn, according to directional arrow 162 on FIG. 11, and also engage stirring element 158. Rotor 126, of course, is motivated by the interaction of rotating shaft 118 of motor 116 turning second miter gear 146 and first ring gear 144, connected to rotor 126. The elongated aperture 156 formed through rotor 126 loosely encompasses stirring element 158, allowing stirring element 158 drop to the base 172 of container 162, under the influence of gravity. Also, the rotation or turning of rotor 126 tends to swing or tilt stirring element 158 outwardly towards the wall 174 of container 162 according to directional arrow 176. Directional arrow 178, FIG. 12, shows the imparted rotational motion on stirrer 158. With reference to FIG. 13, it should be noted that stirrer 158 is shown schematically and includes a pivot 180 that allows the bottom appendage 182, thereof, to closely travel along bottom 172 of container 162. It has been found that such a stirring apparatus 158 suitable for mixing heavier particulate foodstuffs such as beans, corn, green coffee beans, and the like. With reference to FIG. 14, another stirrer 184 is employed with stirring device 10A. Again, stirring element 184 includes a pivot 186 and a pivotally attached leg or appendage 188. It should be noted that if a Smaller container such as container 190, shown in dashed line on FIG. 14, is employed, stirring element 184 will retreat from the sidewall 192 of smaller container 190 and move, according to directional arrow 194, to a position shown in dashed line on FIG. 14. Leg 188 of stirring element 184 will remain on the bottom 196 of container 190, in this regard. Stirring element 158 may also take the form of a wooden or plastic spoon being sized to pass through elongated aperture 156 of rotor 126 at housing 110 second portion 114.

Figure 19:
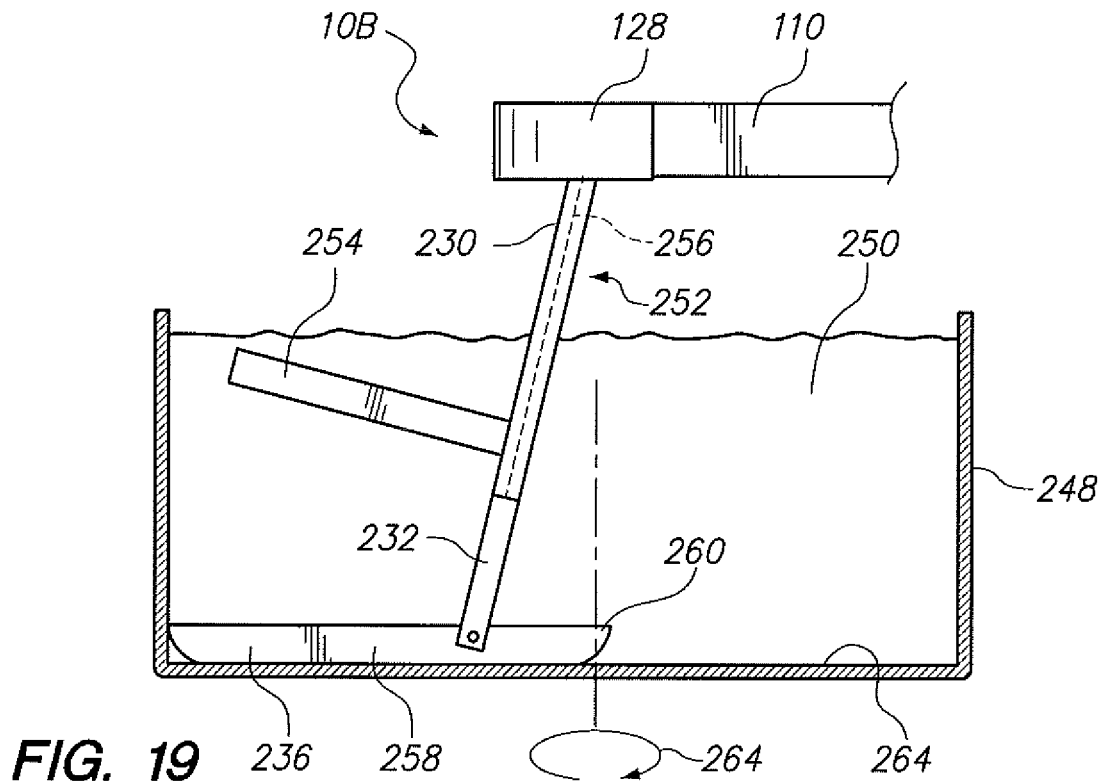
FIG. 19 is a schematic view of the device of the present application showing the stirring action of a stirring element having a lower blade and intermediate arm in a relatively large cooking vessel.
Figure 20:
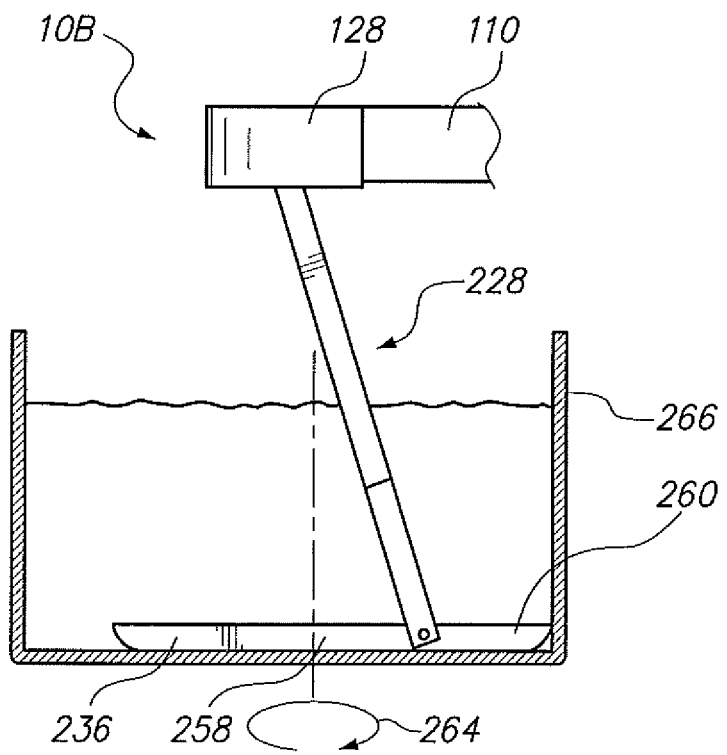
FIG. 20 is a schematic view of the device of the present application showing the orientation of a stirring element in a cooking vessel smaller than the cooking vessel of FIG. 19.

In operation, the embodiment 105, depicted in FIG. 16-18, is shown in use in FIGS. 19-22. It should be noted that rotor 222 is located in end portion 128 of housing 110. A relatively large cooking vessel 248 is shown as containing a liquid body 250. A stirring element 252, similar to stirring element 228 of FIGS. 17 and 18, except that a stirring arm 254 fixed to shaft 230 by any suitable means such as gluing, Welding, or simple friction engagement within a slot 256, depicted on phantom on FIG. 19. As may be seen, blade 236 includes a long portion 258 and a short portion 260. Directional arrow 262 depicts the turning of stirring element 252. FIG. 19 illustrates the following of the perimeter of cooking vessel 248 by long portion 258 of blade 236 of stirring element 252. Of course, the telescoping relationship between shafts 230 and 232 of stirring element 252 allows blade 236 to travel along bottom 264 of cooking vessel 248. FIG. 20 depicts a smaller cooking vessel 266 employing stirring element 228 used with rotor 222 of device 10B. As may be seen, stirring element 228 is allowed to rotate such that small end 260 of blade 236 follows the perimeter of cooking vessel 266 when turning according to directional arrow 264.

Figure 21:
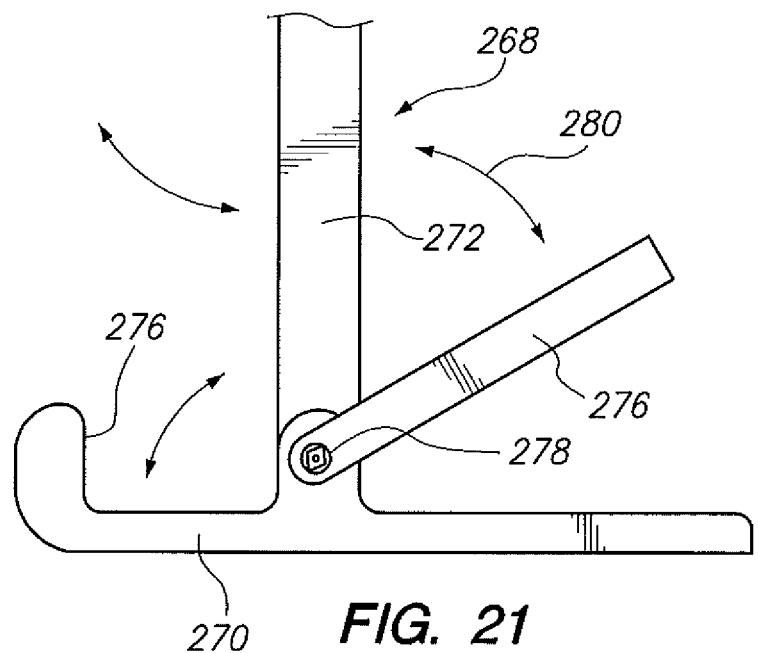
FIG. 21 is a partial side view of another stirring element useable with the device of the present application.
Figure 22:
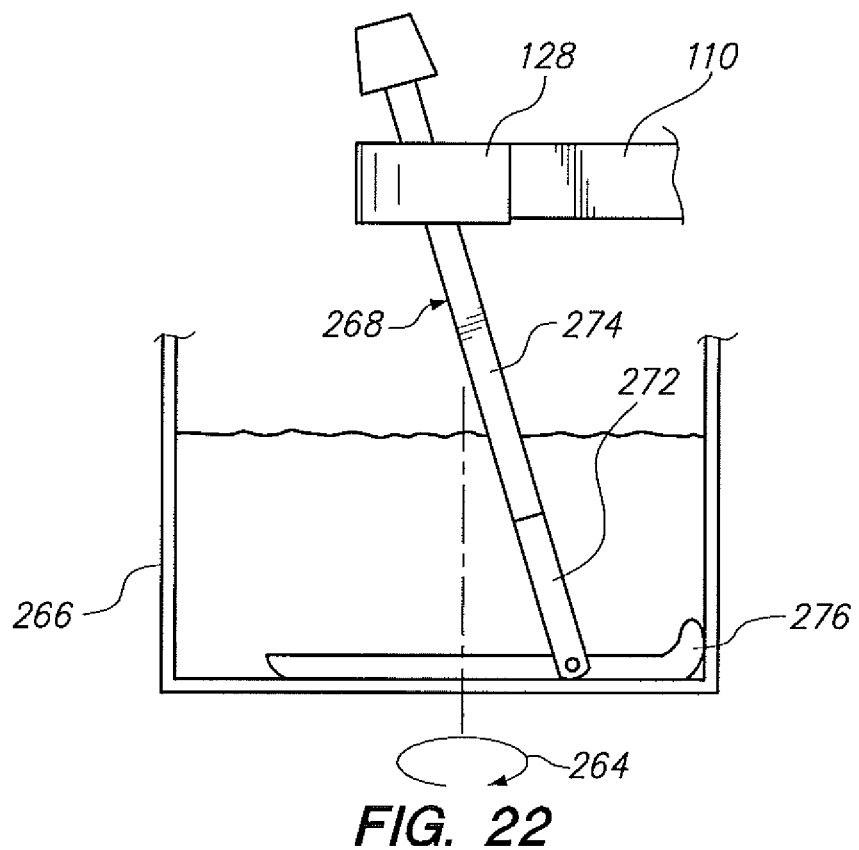
FIG. 22 is a schematic view of the device of the present application employing a stirring element weighted downwardly.

FIG. 21 shows a stirring element 268 in which a blade 270 is pivotally attached to a shaft 272 which telescopes relative to shaft 274, FIG. 22. Blade 272 includes a flange or fin 276 which aides in the urging of stirring element 268 toward the periphery of cooking vessel 266 when stirring occurs according to directional arrow 264. In addition, FIG. 21 shows a different terminus to stirring element 268 in which an arm 276 is pivotally attached to blade 270 by a friction nut 278 to allow arm 276 to be oriented in a particular position during the rotation of blade 272 according to directional arrow 280.

Figure 15:
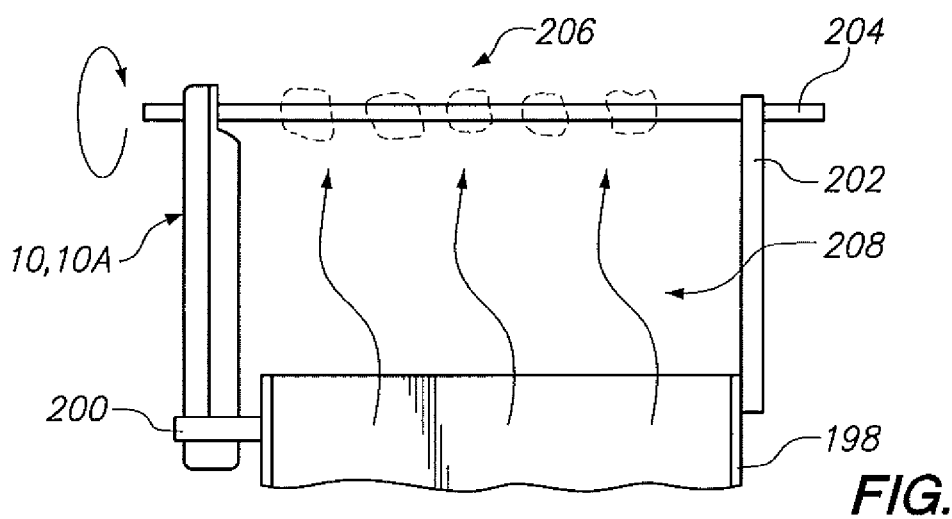
FIG. 15 is a schematic view of the stirring apparatus of the present application utilized as a rotisserie.

It should be realized that device 10, 10A, or 10B may be employed as a rotisserie by providing a heat source 198, such as a barbeque, and fashioning a bracket 200 and a wishbone support 202 thereupon. Bracket 200 would support apparatus 10 or device 10A in an upright position and a skewer would be held by motor 12 or rotor 126, respectively, at one end, and by wishbone support 202 at the other end. It should be noted that embodiment 10A is illustrated in FIG. 15 for the sake of brevity. Food stuffs 206 are found on skewer 204 and are accessible to heat, directional arrows 208, emanating from heat source 198.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A stirring mechanism for agitating fluid in a container comprising:
   a. a motor including a rotating output shaft;
   b. a source of power, said source of power being connected to said motor to activate said rotating shaft;
   c. a housing supporting said motor said housing including an end portion;
   d. a stirring element, said stirring element including a shaft, said shaft having a first portion said first portion of said shaft including a pair of ears extending outwardly from said shaft, said second portion said shaft including a terminus for contacting fluid in the container;
   e. a rotor rotationally mounted at said end portion of said housing, said rotor further including an aperture having a dimension of elongation therethrough to allow loose encompassing of at least a Portion of said stirring element, said rotor further including a pair of cavities positioned adjacent said aperture, said pair of cavities, each having a wall portion, said pair of cavities being sized to frictionally engage and, permit rotation of said pair of ears extending from said shaft of said stirring element.

2. The mechanism of claim 1 in which said elongated aperture comprises an oval opening through said rotor.

3. The mechanism of claim 1 in which said rotational linkage comprises a first gear connected to said rotor, and a second gear connected to said rotating output shaft of said motor, said first gear meshingly engaging said second gear.

4. The mechanism of claim 3 in which said first gear comprises a ring gear surrounding and connected to said rotor.

5. The mechanism of claim 3 in which said second gear comprises a pinion gear connected to a boss, said housing including a bearing support for said boss.

6. The mechanism of claim 5 in which said first gear comprises a ring gear surrounding and connected to said rotor.

7. The mechanism of claim 1 in which said terminus of said second portion of said shaft of said stirring element further comprises a blade pivotally attached to said shaft at a pivot.

8. The mechanism of claim 7 in which said blade comprises a first part and a second part, said first part extending further from said pivot than said second part.

9. The mechanism of claim 1 in which said shaft of said stirring element includes a first body and a second body, said first and second bodies being telescopically mounted relative to one another.

10. The stirring device of claim 1 in which said stirring element includes a blade at said terminus rotatably attached to said shaft.

11. The stirring device of claim 10 which further comprises an arm pivotally attached to said shaft of said stirring element.

12. A stirring device for agitating a fluid in a container having a bottom utilizing a stirring element, comprising:
   a. a motor including a rotating output shaft;
   b. a source of power, said source of power being connected to said motor to activate said rotating shaft;
   c. a housing supporting said motor, said housing including an arm, said housing and said arm defining a plane;
   d. a rotor rotationally mounted at said arm of said housing, said rotor further including an aperture through said rotor, said aperture further having a dimension of elongation oriented within said plane to allow passage and loose encompassing of at least a portion of the stirring element, said elongated aperture further being sized to allow movement of the stirring element along said dimension of elongation and through said aperture under the influence of gravity, said aperture permitting the stirring element to tilt relative to the bottom of the container; and
   e. a rotational linkage for transferring the movements of said rotating output shaft of said motor to said rotor and the stirring element encompassed by said aperture.

13. The stirring device of claim 12 in which said elongated aperture comprises an oval opening through said rotor.

14. The stirring device of claim 12 in which said rotational linkage comprises a first gear connected to said rotor, and a second gear connected to said rotating output shaft of said motor, said first gear meshingly engaging said second gear.

15. The stirring device of claim 14 in which said first gear comprises a ring gear surrounding a connected to said rotor.

16. The stirring device of claim 14 in which said second gear comprises a pinion gear connected to a boss, said housing including a bearing support for said boss.

17. The stirring device of claim 16 in which said first gear comprises a ring gear surrounding and connected to said rotor.

* * * * *